United States Patent

Masubuchi et al.

[11] Patent Number: 5,583,554
[45] Date of Patent: Dec. 10, 1996

[54] IMAGE RECORDING METHOD

[75] Inventors: Fumihito Masubuchi; Yoshihiko Hotta, both of Mishima; Kunichika Morohoshi; Tetsuya Amano, both of Numazu; Atsushi Kutami, Numazu; Makoto Kawaguchi, Shizuoka, all of Japan

[73] Assignee: Ricoh Company, Ltd., Tokyo, Japan

[21] Appl. No.: 376,392

[22] Filed: Jan. 23, 1995

Related U.S. Application Data

[62] Division of Ser. No. 83,541, Jun. 30, 1993.

[30] Foreign Application Priority Data

Jun. 30, 1992 [JP] Japan .................... 4-196075
Jul. 3, 1992 [JP] Japan .................... 4-200414

[51] Int. Cl.⁶ .................... B41J 2/315; B41J 2/32
[52] U.S. Cl. .................... 347/171
[58] Field of Search .................... 347/171, 221; 250/316.1

[56] References Cited

U.S. PATENT DOCUMENTS 5,448,065  9/1995  Masubuchi et al. .................. 250/316.1

FOREIGN PATENT DOCUMENTS 0021263  2/1985  Japan .................... 347/201
0050897  2/1990  Japan .................... 347/171

*Primary Examiner*—Huan H. Tran
*Attorney, Agent, or Firm*—Oblon, Spivak, McClelland, Maier & Neustadt, P.C.

[57] ABSTRACT

An image recording method for recording information in and erasing recorded information from a display medium which contains a reversible thermosensitive recording material capable of writing information therein and erasing recorded information therefrom by the application of heat thereto, by using a heat application member with round corners, and contacting the surface of the heat application member with the display medium.

6 Claims, 3 Drawing Sheets

CONVENTIONAL HOT STAMP

TEMPERATURE (°C)

TEMPERATURE

IMAGE RECORDING METHOD

This is a division of application Ser. No. 08/083,541 filed on Jun. 30, 1993 (Pending).

BACKGROUND OF THE INVENTION

1. Field of the Invention

The present invention relates to an image recording method which is used for a reversible thermosensitive recording material capable of reversibly writing an image thereon and erasing the image therefrom by the application of heat thereto, more particularly to an image recording method applicable to a rewritable card with a thermosensitive display applied thereon used as a prepaid card or a credit card.

2. Discussion of Background

In recent years, there has been a demand for a thermosensitive recording material which is rewritable without using paper for saving natural resources. For instance, a rewritable thermosensitive recording material, which comprises a support and a thermosensitive layer formed thereon comprising a resin such as polyvinyl chloride resin or polyester resin, and an organic low-molecular-weight material such as higher alcohol or higher fatty acid dispersed therein is known as the most promising recording material as disclosed in Japanese Laid-Open Patent Applications 54-119377 and 55-154198.

Recording, that is, image formation and erasure by use of this type of reversible thermosensitive recording material is performed by utilizing the changes in transparency of the thermosensitive layer therein depending upon the temperature thereof. Therefore, both of the image formation and erasure can be carried out by use of a device such as a thermal head or a hot stamp employed for conventional irreversible thermosensitive recording materials.

Recently, attention has been paid particularly to a reversible thermosensitive recording material employed as a display medium for use with a card such as a prepaid card or a credit card. As a heat application member for such a card, a heat-application roller or a thermal head is usable, however it is preferable to use a hot stamp by which heat an be speedily and uniformly applied to a recording material at a portion thereof.

A conventional hot stamp generally has such a structure as shown in FIG. 1(g). In FIG. 1(g), the contact surface of a hot stamp 11 with a display medium 5 is made of a metal or a metal on which a lubricating material is coated. Reference numeral 2 indicates an infrared lamp, and reference numeral 3, a temperature sensor in FIG. 1(g). Image formation and erasure are performed on the display medium 5 by the application of heat thereto by the hot stamp 11 on a supporting base 61. The hot stamp 11 is movable in the directions of the arrows.

When image erasing is performed by use of a hot stamp on a display medium it is possible to occur that the card and the hot stamp are not brought into uniform contact with each other even by a slight unevenness of the surface of the card or by the adhesion of foreign materials to the card, heat is not uniformly conducted to the reversible thermosensitive recording material on the card, and images thereon are erased only in lines or in spots.

In particular, when image formation and erasing are performed on a thick card made of polyvinyl chloride such as a credit card, there is a phenomenon that the card is deformed during repeated use thereof, so that it becomes difficult to bring the hot stamp into uniform contact with the deformed card.

In contrast, when the pressure to be applied to the hot stamp is increased, the hot stamp can be easily brought into uniform contact with a reversible thermosensitive recording material. However, when the pressure applied to the hot stamp is increased too much, the card may be deformed or the deterioration of the reversible thermosensitive recording material may be promoted.

Furthermore, in the case where image erasure is performed by use of a hot stamp on a card with minute concave and convex portions such as emboss, which originally exist on the card, the card and the hot stamp are not easily brought into uniform contact when the pressure to the heat stamp is increased.

SUMMARY OF THE INVENTION

An object of the present invention is to provide a recording method by which information writing and erasing can be reliably performed on a reversible thermosensitive recording material capable of forming images thereon and erasing the same therefrom, particularly an image recording method by which information writing and erasing can be securely performed on a reversible thermosensitive recording material provided on a thick and rigid card, without causing the deformation of the card.

The object of the present invention can be achieved an image recording method of recording information in and erasing recorded information from a display medium which comprises a reversible thermosensitive recording material capable of writing information therein and erasing recorded information therefrom by the application of heat thereto, by use of a heat application member with a flat portion by bringing the flat portion into contact with the display medium provided on a supporting base, at least one of the display medium or the flat portion of the heat application member having an elastically deformable portion through which one of the display medium or the flat portion of the heat application member performs elastic deformation and the display medium is capable of coming into close contact with the heat application member.

The object of the present invention can also be achieved by an image recording method of recording information in and erasing recorded information from a display medium which comprises a reversible thermosensitive recording material capable of writing information therein and erasing recorded information therefrom by the application of heat thereto, by use of a heat application member having round corners at a contacting surface thereof with the display medium.

Furthermore, the object of the present invention can also be achieved by an image recording method of recording information in and erasing recorded information from a display medium which comprises a reversible thermosensitive recording material capable of writing information therein and erasing recorded information therefrom by the application of heat thereto, by use of a heat application member, with the provision of a pressure application member at the periphery thereof whose temperature is lower than that of the heat application member, the pressure application member pressing and fixing the display medium at least while the heat application member is in contact with the display medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2(a) is a perspective view of an example of a card with a reversible thermosensitive recording material provided thereon as a display portion thereof;

FIGS. 2(b) and 2(c) are cross-sectional views of examples of reversible thermosensitive recording materials;

DETAILED DESCRIPTION OF THE PREFERRED EMBODIMENT

Figure 1A:
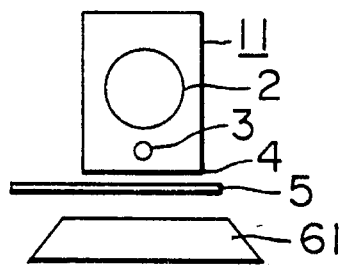
FIGS. 1(a) and 1(b) are the front views of examples of hot stamp employed as a heat application member for use with a display medium and a supporting base.
Figure 1B:
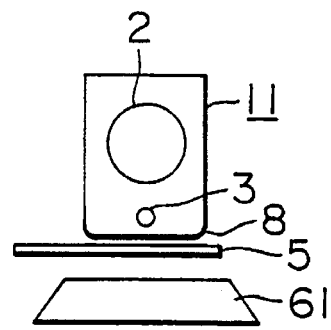

The inventors of the present invention have made studies in order to eliminate the above-mentioned shortcomings, and found following countermeasures for the problems: (a) The uniform contact between a heat application member and display medium can be maintained if at least one of the display medium and the heat application member is flexibly deformed corresponding to concave and convex portions on the display medium. (b) It is necessary that at least one of the display medium or the heat application member have an elastic deformation of 85° or less in terms of a spring type hardness $Hs_1$ with elastic recovery. (c) The elastic deformation is caused by providing a highly elastic member with appropriate hardness and thickness on the front side or back side of the heat application member or the display medium. (d) The card contained in the display medium can be deformed by the corners of a hot stamp pressed thereto and such deformation is prevented if the hot stamp has round corners. (e) Alternatively, the deformation of a card such as by warpage thereof can be prevented by securing the card by a pressure application member provided around the hot stamp, for which the temperature is lower than that of the hot stamp. The present invention has been thus accomplished.

Namely, in a first image recording method of recording information in and erasing recorded information from a display medium which comprises a reversible thermosensitive recording material capable of writing information therein and erasing recorded information therefrom by the application of heat thereto, a heat application member with a flat portion is brought into contact with the display medium provided on a supporting base, at least one of the display medium or the flat portion of the heat application member having an elastically deformable portion through which one of the display medium or the flat portion of the heat application member performs elastic deformation and the display medium is capable of coming into close contact with the heat application member.

In the above-mentioned first image recording method, it is preferable that the elastic deformation be 85° or less measured in terms of a spring type hardness $Hs_1$ by a spring type hardness tester type A defined in accordance with Japanese Industrial Standard (JIS) K 6301.

Moreover, it is preferable that the heat application member have the elastically deformable portion which comprises a highly elastic member through which the elastic deformation can be attained.

Furthermore, it is preferable that the display medium comprise a highly elastic member at a side opposite to the heat application member, through which the elastic deformation can be attained. Alternatively, the supporting base may comprise a highly elastic member which comes into contact with the display medium, through which elastic deformation of the display medium can be attained.

In a second image recording method of recording information in and erasing recorded information from a display medium which comprises a reversible thermosensitive recording material capable of writing information therein and erasing recorded information therefrom by the application of heat thereto, a heat application member has round corners at a contacting surface thereof with the display medium.

Furthermore, in a third image recording method of recording information in and erasing recorded information from a display medium which comprises a reversible thermosensitive recording material capable of writing information therein and erasing recorded information therefrom by the application of heat thereto, a heat application member is employed with the provision of a pressure application member at periphery thereof whose temperature is lower than that of the heat application member, the pressure application member pressing and fixing the display medium at least while the heat application member is in contact with the display medium.

A conventional reversible thermosensitive recording material is mainly composed of organic materials. The reversible thermosensitive recording material assumes a first coloring state within a first temperature range which is higher than room temperature, and assumes a second coloring state within a second temperature range which is higher than the first temperature range.

When the above-mentioned conventional reversible thermosensitive recording material is heated to a temperature (ranging from about 150° to 200° or more, although this temperature varies, depending on the materials contained in the recording material) which is higher than the second temperature range, thermal breakdown occurs in the reversible thermosensitive recording material, so that the reversible thermosensitive recording material loss reversibility.

At the beginning of the development of the reversible thermosensitive recording material, the above-mentioned thermal breakdown was not regarded as an important problem because thermal breakdown occurs also in an irreversible thermosensitive recording material comprising organic materials at about the same temperature at which thermal breakdown occurs in the above-mentioned reversible thermosensitive recording material.

However, the following facts have been provided in recent years:

Thermal breakdown caused in the irreversible thermosensitive recording material is not prominent since heat application to the irreversible recording material is carried out only once and for a short time. In contrast to this, the thermal breakdown progresses little by little in the reversible thermosensitive recording material when the heat application is repeated for 100 times, or 1000 times, although the thermal breakdown is not visually inspected after heat is applied thereto only once at a low temperature, and as a result the reversible thermosensitive recording material loses reversibility. In fact, the least upper boundary of the heat application temperature to the reversible thermosensitive recording material is extremely low (20° C. or more) in comparison with that of the irreversible thermosensitive recording material.

Furthermore, the reversible thermosensitive recording material is caused to assume two coloring states under the application of heat thereto at temperatures in the respective two temperature ranges, obtained by dividing the temperature range between the above-mentioned least upper boundary of the heat application temperature and room temperature, so that a temperature range which causes the reversible thermosensitive recording material to assume one of the two coloring states is as narrow as half or less of the temperature range which causes the irreversible thermosensitive recording material to be colored.

It is necessary to control the temperature of the reversible thermosensitive recording material with high accuracy for reversible image recording thereon, which has not been seen in conventional thermosensitive recording, even if the reversible recording is performed with the image being recorded in two colors without gradation.

Metal is mainly employed as a material for a conventional hot stamp, because metal has high thermal conduction properties and can uniformly maintain the temperature at the surface thereof. Therefore, the conventional hot stamp has a structure in which a heater is applied to a metal plate or a metal-mass, and a bare metal is provided on the surface of the hot stamp, or a coating material, which is for imparting lubrication properties or for preventing the metal from corrosion, is coated on the bare metal.

Advantages in the use of a hot stamp are that heat can be applied to only a desired portion in the display medium, and display medium can be heated for a maximum length of time although the time to heat the display medium by use of a heat-application apparatus is limited. On the other hand, there is the shortcoming that it is difficult to maintain the temperature of the display medium uniformly by use of a hot stamp, and to maintain uniform contact of the hot stamp with the display medium when the display medium has a large surface area. Therefore, a hot stamp is mot preferably employed as the heat application member for image formation and erasure on a thin and soft display medium with a small surface area.

A thermal head or a heat-application roller can be brought into contact with a display medium in a line. In contrast, a hot stamp can be brought into contact with a display medium on a surface. Therefore, when heat is applied to pa display medium at a surface thereof by use of a hot stamp, concave and convex portions on the display medium largely influence on the contacting state between the display medium and the hot stamp, and there is a possibility that contact failure may occur between the surface of the display medium and the hot stamp, affected even by the existence of only a single concave and convex portion on the display medium. A countermeasure is required for the above-mentioned problems with respect to unevenness of the display medium at the surface thereof even if such unevenness does not cause any problems when heat is applied by use of a thermal head or a heat-application roller.

In particular, when a display medium comprises a thick and rigid card such as a credit card or an ID card and a reversible thermosensitive recording material is applied to the thick and rigid card, it is difficult to bring a conventionally employed hot stamp with a bare metal section thereon into uniform contact with the display medium. This is because the thick and rigid card is fabricated by emboss processing and originally has concave and convex portions at the surface thereof, and the card is not easily recovered once the card is distorted. As a result, the step to cause the reversible thermosensitive recording material to be transparent within an extremely limited specific temperature range becomes difficult when thermal energy is not uniformly conducted to the recording material on the thick and rigid card because of the non-uniform contact between the card and the hot stamp.

The position at which the highly elastic member is provided is determined in consideration of the situations of the reversible thermosensitive card and a recording material applied to the card as follows:

Situation 1: The image is formed on a rigid reversible thermosensitive recording material incorporated in a rigid card, or on a single rigid reversible thermosensitive recording material.

Situation 2: The image is formed on a rigid reversible thermosensitive recording material incorporated in a soft card.

Situation 3: Image formation is conduced on a soft reversible thermosensitive recording material incorporated in a soft card, or on a single soft reversible thermosensitive recording material.

To cope with all the above-mentioned three situations, a highly elastic member is provided on the elastically deformable portion of a hot stamp serving as a heat application member, through which the elastic deformation can be attained.

The highly elastic member is provided on a display medium at a side opposite to the hot stamp, to cope with situations 2 and 3.

In the above case, it is preferable that the highly elastic member have a hardness in the range of 5° to 60° measured in terms of a spring type hardness $Hs_2$.

Furthermore, the highly elastic member is provided on the supporting base on which the highly elastic member comes into contact with the display medium, whereby elastic deformation of the display medium can be attained.

In the above case, it is preferable that the highly elastic member have a hardness in the range of 5° to 60° measured in terms of a spring type hardness $Hs_2$.

A highly elastic member provided on the surface of a hot stamp will now be explained.

In order to bring the hot stamp into contact with a display medium comprising a card, which is slanted with respect to the hot stamp, the highly elastic member can be provided between the supporting base and the hot stamp, in the hot stamp, at the surface of the hot stamp, at the surface of the display medium, in the display medium, or between the recording material and the card.

In addition to the above, it is appropriate to provide the highly elastic member at a portion between the surface of the hot stamp and the surface of the display medium, in order to bring the hot stamp into uniform contact with the display medium comprising a card with concave and convex portions thereon.

However, in the case where the highly elastic member is provided on the display medium on a surface thereof, it becomes difficult to record information on the display medium, although the image can be erased without difficulty.

In conclusion drawn from the above, it is most appropriate to provide the highly elastic member at the surface of the hot stamp as a heat application member. By the provision of the highly elastic member at the surface of the hot stamp, it is possible that the heat application member, even with concave and convex portions at the surface thereof, comes into uniform contact with the display medium since the highly elastic member deforms corresponding to the concave and convex portions on the surface of the display medium.

When the highly elastic member is provided on the surface of the hot stamp, it is necessary to take the thermal conduction properties of the highly elastic member into consideration.

It is preferable that the thickness (d) of the highly elastic member be as thin as 5 mm or less, more preferably 3 mm or less, and further preferably 2 mm or less. When the thickness of the highly elastic member is less than the above-mentioned least upper boundary, it becomes difficult to cause the highly elastic member to deform corresponding to the concave and convex portions at the surface of the display medium. Therefore, it is preferable that the thickness (d) of the highly elastic member be 0.1 mm or more, more preferably 0.2 mm or more, and further preferably 0.5 mm or more.

Moreover, with regard to the hardness of the highly elastic member, the softer the highly elastic member, the more easily the heat application member corresponds to the concave and convex portions on the display medium. More specifically, it is preferable that the highly elastic member have a surface hardness of 80° or less in terms of the spring type hardness Hs defined by the Japanese Industrial Standards (JIS) K 6301, more preferably 75° or less, and further preferably 70° C. or less.

In regard to thermal conductivity $\kappa$ (W·m$^{-1}$·K$^{-1}$ (The International System of Units)), the higher the thermal conductivity, the more uniformly and speedily heat conducts. It is preferable that the highly elastic member have the thermal conductivity of at least 0.05 W·m$^{-1}$·K$^{-1}$ or more, more preferably 0.1 W·m$^{-1}$·K$^{-1}$ or more, and further preferably 0.2 W·m$^{-1}$·K$^{-1}$ or more.

There are two conflicting relationships among the thickness of the highly elastic member, hardness thereof, and thermal conductivity thereof as follows:

(a) The harder the highly elastic member in terms of the spring type hardness, the thicker the highly elastic member to be required, in order to have excellent contact of the heat application member with the display medium, and (ii) The lower the thermal conductivity of the highly elastic member, the thinner the highly elastic member to be required, in order to make the thermal conductivity efficient.

The above two relationships are expressed by the following formulas:

$$\frac{Hs}{d} \leq A \qquad \text{(i)}$$

$$B \leq \frac{\kappa}{d} \qquad \text{(ii)}$$

Thus, constants A and B can be obtained.

The smaller the constant A, the better the highly elastic member fits to the concave and convex portions on the surface of the display medium. It is preferable that the constant A be 100, more preferably 50, and further preferably 10 (the unit is omitted).

Moreover, the larger the constant B, the larger the thermal conductivity of the highly elastic member. It is preferable that the constant B be 0.1, more preferably 1, and further preferably 10 (the unit is omitted).

When the highly elastic member, in particular, a rubber plate is provided on the surface of the hot stamp, not only the display medium can be brought into close contact with the hot stamp, but also the wide-range temperature variation of the hot stamp is allowable.

Figure 3:
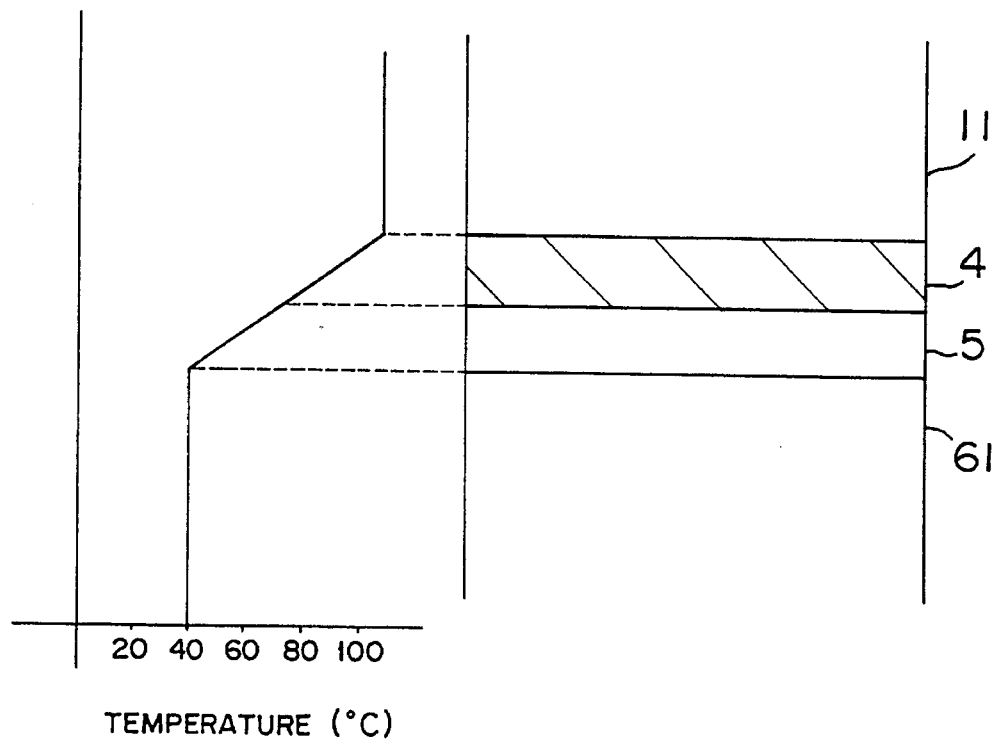
FIG. 3 is a diagram showing temperature-distribution of a reversible thermosensitive recording material when the reversible thermosensitive recording material is heated by a hot stamp comprising a rubber plate as a high elastic member.

This is because, as shown in FIG. 3, there is a tendency that the surface temperature of the rubber plate used as a highly elastic member 4 does not increase so much when the internal temperature of a hot stamp 11 is increased. The smaller thermal conductivity of the rubber plate or the thicker the rubber plate, the more conspicuous the above-mentioned tendency. The surface temperature of the rubber plate is obtained when the heat conducted from the hot stamp to the rubber plate balances with the heat escaped from the surface of the rubber plate. However, since the rubber plate does not easily conducts the heat, the surface temperature of the rubber plate is supposed to be lower than the temperature of the hot stamp. For instance, the surface temperature of the rubber plate is obtained at an average value of the temperature of the hot stamp and the ambient temperature.

It is necessary to control the temperature in a narrow temperature range when the reversible thermosensitive recording material for use in the present invention is heated. When the temperature variation of the hot stamp is allowable by the provision of the highly elastic member, image recording can be performed on a reversible thermosensitive recording material with high reliability.

When the highly elastic member is provided on the display medium at a side opposite to the hot stamp, it is desirable that the highly elastic member be as thick as 0.05 mm or more, more preferably 0.1 mm or more, and further preferably 0.2 mm or more. In addition, it is preferable that the thermal conductivity of the highly elastic member be as low as 0.2 W·m$^{-1}$·K$^{-1}$ or less, more preferably 0.1 W·m$^{-1}$·K$^{-1}$ or less, and further preferably 0.05 W·m$^{-1}$·K$^{-1}$ or less, to maintain the temperature of the display medium high.

Moreover, by the provision of the highly elastic member on the back side of the display medium, only when the display medium is easily bent, excellent contact between the heat application member and the display medium can be obtained, and the excellent thermal conduction from the heat application member to the display medium can be performed. It is preferable that the display medium have a bending moment of 500 gf.cm or less, more preferably 100 gf.cm or less, and further preferably 20 gf.cm or less measured by testing method for stiffness of paperboard by bending load defined by JIS P 8125.

When the highly elastic member is provided on the front side of the supporting base provided under the heat application member in such a fashion that a display medium is interposed between the supporting base and the heat application member with the highly elastic member facing the display medium, it is preferable that the highly elastic member be thick and have a low thermal conductivity, similarly to the case where the highly elastic member is provided on the back side of the display medium. In this case, it is preferable that the thickness of display medium be 0.1 mm or more, more preferably 0.2 mm or more, and further preferably 0.5 mm or more. Moreover, it is preferable that a display medium comprising a card as a supporting member have a bending moment of 500 gf.cm or less, more preferably 100 gf.cm or less, and further preferably 20 gf.cm or less measured by testing method for stiffness of paperboard by bending load defined by JIS P 8125, as mentioned previously.

The value of the spring type hardness $Hs_2$ for use in the present invention is basically obtained in accordance with the spring type hardness test type A defined by JIS K-6301. However, when the shape of the highly elastic member is like a sponge form, and it is difficult to measure the spring type hardness of the material by the spring type hardness tester type A, the hardness value is measured by use of another tester such as Pusey-Johns tester and the value is converted into spring hardness value.

Furthermore, the value of the spring type hardness $Hs_1$ for use in the present invention is obtained by directly measuring the hardness of the heat application member and that of the display medium at a surface thereof by use of the above mentioned spring type hardness tester type A, while the image recording operation is performed. The hardness of the display medium is measured in such a configuration that the display medium is provided on the supporting base, as the image recording operation is being performed.

When image formation and erasure are performed on the display medium under the application of heat to the both side of the display medium, with the display medium being interposed between two or more heat application members, it is preferable that at least heat application members which are in contact with one of the two sides of the recording medium have the elastically deformable portion comprising a highly elastic member through which the elastic deformation can be attained, and that the highly elastic member have a hardness in the range of 5° to 70° in terms of the spring type hardness $Hs_2$, and a thickness in the range of 0.1 to 5 mm.

In the case where the temperature of one of the heat application members is higher than the others, it is preferable that at least one of the heat application whose temperature is higher than the other members have the elastically deformable portion comprising a highly elastic member through which the elastic deformation can be attained, and that the highly elastic member have a hardness in the range of 5° to 70° in terms of the spring type hardness $Hs_2$, and a thickness in the range of 0.1 to 5 mm.

It is more preferable that all the heat application members have the above-mentioned elastically deformable portion, and that the highly elastic members have a hardness in the range of 5° to 70° in terms of the spring type hardness $Hs_2$, and a thickness in the range of 0.1 to 5 mm.

The highly elastic member in the present invention indicates an elastically deformable material with reversibility, having deformation percentage of about 1% of the original size. A representative example of the highly elastic member is a rubber. In the present invention, as a highly elastic member, rubber-like materials which have the own elastic properties are employed in the form of a plate, or rigid materials with high thermal conductivity such as metals or ceramics are employed being made into an easily deformable form such as sponge, steel wool or spring to impart elastic properties thereto.

In the case where the above-mentioned sponge form material is employed as the highly elastic member, air contained in the sponge form material prevents thermal conduction from the heat application member to the display medium. Therefore, it is effective to contain the liquid with high thermal conduction properties in the sponge. Moreover, it is also effective to provide a thin film made of a soft material such as a vinyl sheet on the surface of the sponge form material serving as a highly elastic member, to make the non-uniform surface of the sponge form material even. Any thin film can be used, in this case, as long as the film has a satisfactory durability and is soft, and such elastic properties of the rubber-like material is not necessarily required.

There are natural rubber and synthetic rubber employed as the rubber-like material with elastic properties.

Specific examples of the synthetic rubber include diene-based rubber such as polyisoprene, polybutadiene, copolymer made from the polyisoprene and other vinyl compound, and copolymer made from the polybutadiene and other vinyl compound; olefin-based rubbers such as butyl rubber and ethylene—propylene rubber; polyurethane-base rubber; silicone rubber; and a commercially available fluororubber "Viton" (Trademark), made by Du Pont-Showa Denko Co., Ltd.

Of these, silicone rubber and fluororubber are excellent as highly elastic members with regard to high heat resistance and high thermal conduction properties thereof. In addition, it is effective to fill the rubber-like material with a material having high thermal conduction properties such as silica to increase the thermal conduction properties of the rubber like material.

As the deformation of a card on which the reversible thermosensitive recording material is applied, there is a case where a difference in lebel in the form of lines is observed in the card. This deformation is caused by the corners of a heat application member such as a hot stamp pressed to the card. When the hot stamp have round corners, this type of deformation can be prevented. In addition to the above, the same effect can be obtained by the provision of the highly elastic member on the surface of the hot stamp, which is to be contact with the display medium.

With respect to the other deformation such as warpage of the card, it is considered that the occurrence of the warpage can be prevented by the application of pressure to the card not to be deformed while the card is softened by heat application of heat thereto, by some method. For instance, the warpage of the card can be prevented by pressing the card using a pressure application member provided at the periphery of a hot stamp whose temperature is lower than that of the hot stamp.

Figure 1C:
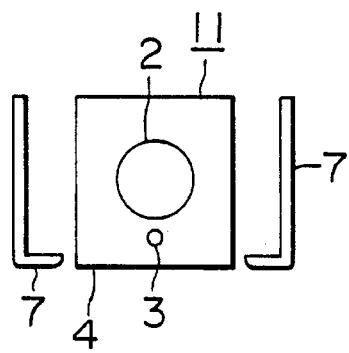
FIG. 1(e) is a front view of an example of a heat-application roller employed as a heat application member.
FIG. 1(f) is a front view of an example of a hot stamp employed as a heat application member for use with a display medium and a supporting base.
FIG. 1(g) is a front view of a conventional hot stamp employed as a heat application member for use with a display medium and a supporting base.
Figure 1D:
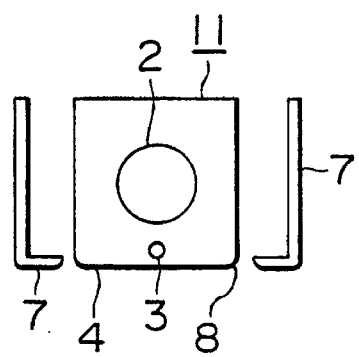

Specific examples of the pressure application member provided at the periphery of the hot stamp are shown in FIGS. 1(c) and 1(d). In FIGS. 1(c) and 1(d), reference numeral 11 indicates a hot stamp; reference numeral 2, an infrared lamp; reference numeral 3, a temperature sensor; reference numeral 4, a highly elastic member made of rubber in the form of a plate; and reference number 7, a pressure application member provided at the periphery of the hot stamp 11. The hot stamp 11 shown in FIG. 1(d) has round corners 8 at a contacting surface with a display medium. The pressure application member 7 is caused to be contact with the display medium simultaneously with the hot stamp 11 or before the hot stamp 11 comes into contact with the display medium to press and fix the display medium. Thereafter, the pressure application member 7 are detached from the display medium simultaneously with the display medium, or after the hot stamp 11 is detached from the display medium.

Thus, the display medium can be prevented from the deformation by the provision of the pressure application member 7 at the periphery of the hot stamp 11.

It is preferable that pressure applied by the pressure application member 7 to the display medium be the same as that by the hot stamp 11, or more.

Figure 1E:
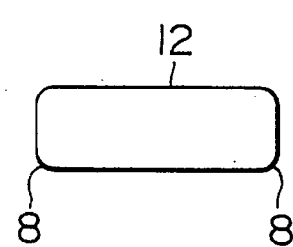
Figure 1F:
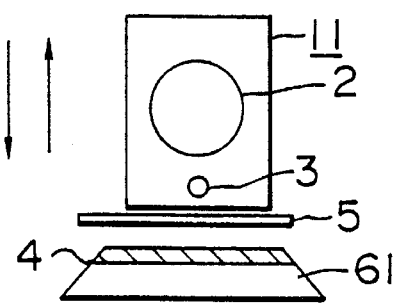
Figure 1G:
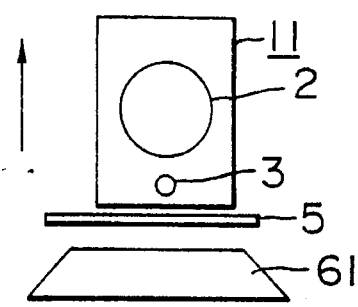

It is preferable that the corners of the hot stamp have a curvature radius of 0.5 to 20 mm, more preferably 1 to 10 mm, and further preferably 1.5 to 5 mm. The treatment to make the corners of the hot stamp round can be applied to other heat application members such as a heat-application roller. For instance, when image formation and erasure operation is performed by use of the heat-application roller 12 with round corners 8 shown in FIG. 1(e), it is possible to prevent the display medium from being scraped by the heat-application roller.

A hot stamp used as a heat application member exhibits an excellent performance for use in the image recording method of the present invention.

As a temperature controlling mechanism of a hot stamp, not only a generally employed mechanism in which a heat generating element, a temperature sensor, and a temperature controlling device are used in combination, but also a mechanism constituted only by a heat generating element made of a self-temperature-controlling-type heat generating material are employed. The heat generating element made of the self-temperature-controlling type heat generating material has characteristics in that electrical resistance of the heat generating element is increased as the temperature of the self-temperature-controlling-type heat generating material is increased. Therefore, the temperature of this type of heat generating element can be constantly maintained without controlling the temperature by use of a temperature controlling device.

Examples of the self-temperature-controlling-type heat generating material are an electroconductive ceramics and an electroconductive resin composition.

The heat application member comprising such a heat-generating material has the advantage that temperature thereof can be controlled with high accuracy even with a simple structure. On the other hand, there is the shortcoming that it is difficult to flexibly change the temperature of the heat application member as desired by the heat application member.

The display medium for use in the present invention basically comprises a support and a reversible thermosensitive recording layer provided on the support.

Figure 2A:
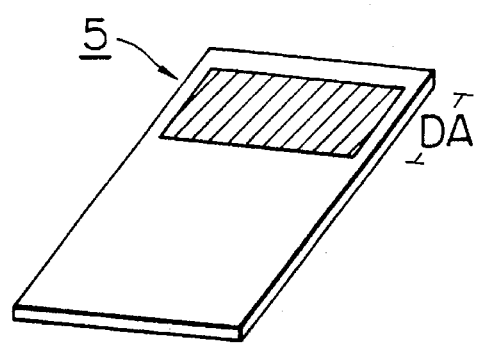
FIGS. 2(a) and 2(b) are the front views of examples of a hot stamp employed as a heat application member for use with a pressure application member.
Figure 2B:
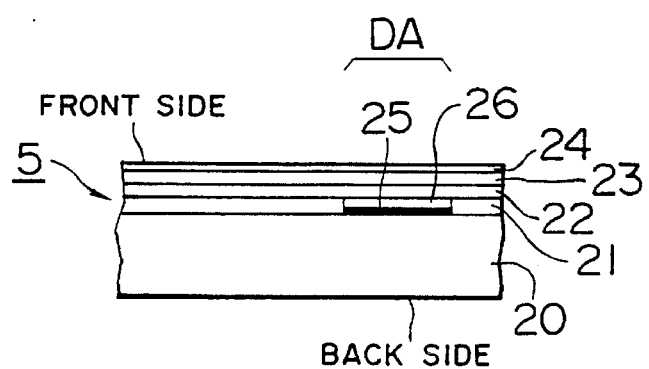

In the present invention, the front side of the display medium indicate the side of a reversible thermosensitive recording layer, and the back side of the display medium indicate the side of the support as shown in FIG. 2(b).

When the display medium comprises a card, it is possible that the card is used also as a supporting medium of the display medium, or the support of the display medium is adhered on the supporting medium.

FIG. 2(a) is a perspective view of an example of a display medium 5 according to the present invention comprising a thick card made of polyvinyl chloride and a thermosensitive recording material applied thereon as a display area DA thereof.

FIG. 2(b) is a cross-sectional view of an example of a display medium according the present invention comprising a thick card made of polyvinyl chloride 20, an adhesive agent layer 21, a transparent PET film 22, a reversible thermosensitive recording layer 23, and a protective layer 24 successively overlaid on the thick card made of polyvinyl chloride 20. The adhesive agent layer 21 contains therein an air-containing portion 26, and a colored layer 25 which is directly provided on the card made of polyvinyl chloride 20.

The front side of the display medium at a portion indicated as DA serves as a display area utilizing the difference in reflectance between the air-containing portion 26 and the colored layer 25.

Figure 2C:
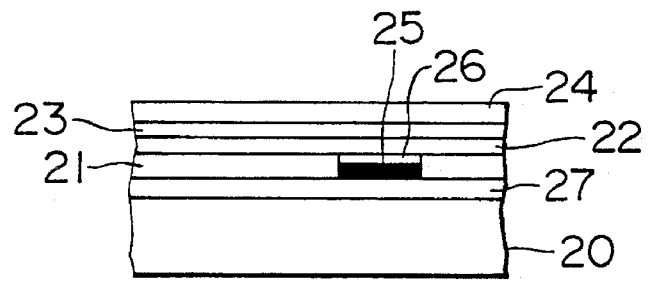

FIG. 2(c) is a cross-sectional view of another example of the display medium with the same structure as that of display medium shown in FIG. 2(b) except that a highly elastic member layer 27 is provided between the card made of polyvinyl chloride 20 and the adhesive agent layer 21.

In the reversible thermosensitive recording material for use in the present invention, the coloring state is not changed at room temperature. When the reversible thermosensitive recording material is heated to a first temperature, the recording material assumes a first coloring state, while when heated to a second temperature which is higher than the first temperature, followed by decreasing the temperature to room temperature, the recording material assumes the second coloring state.

The reversible thermosensitive recording material according to the present invention is a material which can repeat the above-mentioned change between the first coloring state and the second coloring state. The change of the coloring state is based upon the changes in transmittance, reflectance, absorption wave length, or scattering degree. A reversible thermosensitive recording material, which is in practical use, displays images thereon by changes in the coloring state based upon the above-mentioned changes in combination.

More specifically, reversible thermosensitive recording materials are classified into two types as follows:

(A) Materials which reversible change between a transparent state and a milky white opaque state.

(B) Materials which reversibly change the color thereof because of a dye and the like contained therein.

A representative example of the conventional reversible thermosensitive recording material type (A) is, as mentioned previously, a material comprising a reversible thermosensitive recording layer comprising a matrix resin such as polyester and a organic low-molecular-weight material such as higher alcohol or higher fatty acid dispersed therein. Moreover, an example of the conventional reversible thermosensitive recording material type (B) is a leuco-type thermosensitive recording material with reinforced reversibility as disclosed in Japanese Laid-Open Patent Applications 2-188293 and 2-188294.

In the reversible thermosensitive recording material type (A) comprising a matrix resin and an organic low-molecular-weight material dispersed therein which reversibly changes between the transparent state and the milky white opaque state by the application of heat thereto, it is presumed that the difference between the transparent state and the milky white opaque state is based on the following principle:

(i) In the transparent state, the organic low-molecular-weight material dispersed in the matrix resin consists of relatively large crystals, so that the light which enters the crystals from one side passes therethrough to the opposite side, without being scattered, thus the reversible thermosensitive recording material appears transparent.

(ii) In the milky white opaque state, the organic low-molecular-weight material is composed of polycrystals consisting of numerous small crystals, with the crystallographic axis pointed to various directions, so that the light which enters the recording layer is scattered a number of times at the interfaces of the crystals of the organic low-molecular-weight material. As a result, the thermosensitive recording layer becomes opaque in a milky white color.

The transition of the state of the reversible thermosensitive recording layer depending on the temperature thereof will now be explained by referring to FIG. 4.

Figure 4:
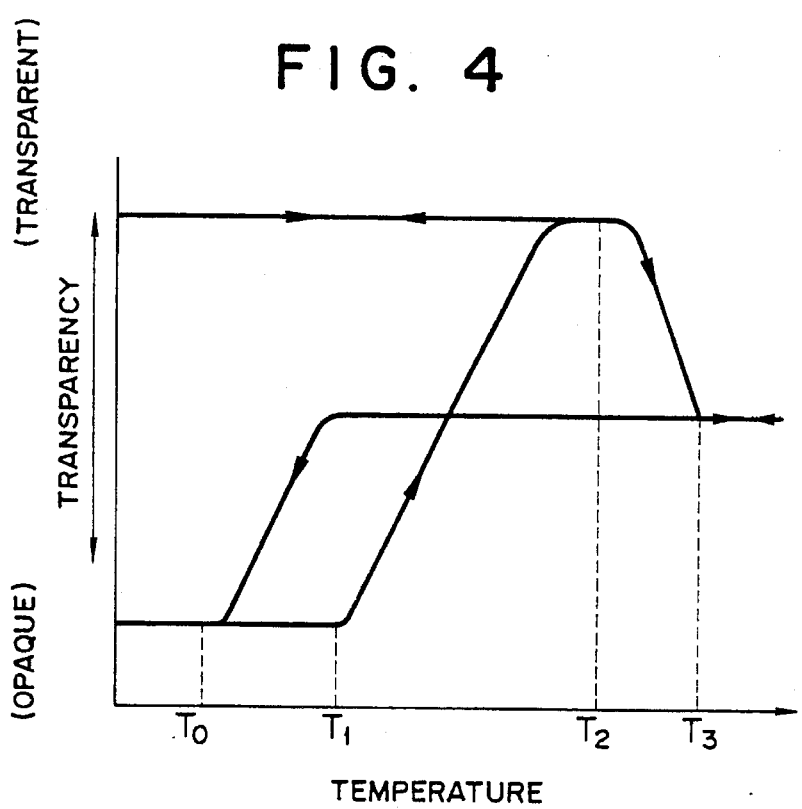
FIG. 4 is a diagram showing characteristics of a reversible thermosensitive recording material depending upon temperature thereof.

In FIG. 4, it is supposed that the reversible thermosensitive recording layer comprising a matrix resin and an organic low-molecular-weight material dispersed in the matrix resin is initially in a milky white opaque state at room temperature $T_0$ or below. When the thermosensitive recording layer is heated to temperature $T_2$, the thermosensitive recording layer becomes transparent. Thus, the recording layer reaches a maximum transparent state at temperature $T_2$. Even if the recording layer which is already in the maximum transparent state is cooled to room temperature $T_0$ or below, the maximum transparent state is maintained. It is considered that this is because the organic low-molecular-weight material changes its state from a polycrystalline state to a single crystalline state via a semi-melted state during the above-mentioned heating and cooling steps.

When the recording layer in the maximum transparent state is further heated to temperature $T_3$ or more, it assumes a medium state which is between the maximum transparent state and the maximum milky white opaque state. When the recording layer in the medium state at temperature $T_3$ or more is cooled to room temperature $T_0$ or below, the recording layer returns to the original maximum opaque state, without passing through any transparent state. It is considered that this is because the organic low-molecular-weight material is melted when heated to temperature $T_3$ or above, and the polycrysts of the organic low-molecular-weight material grow and separate out when it is cooled. If the recording layer in the milky white opaque state is heated to any temperature between temperature $T_1$ and temperature $T_2$, and then cooled to room temperature $T_0$ or below, the recording layer assumes an intermediate state between the transparent state and the milky white opaque state.

When the recording layer in the transparent state at room temperature $T_0$ is again heated to temperature $T_3$ or above, and then cooled to room temperature $T_0$, the recording layer returns to the milky white opaque state. Thus, the reversible thermosensitive recording layer for use in the present invention can assume a milky white opaque state, a transparent state and an intermediate state between the aforementioned two states at room temperature.

Therefore, a milky white opaque image can be obtained on a transparent background, or a transparent image can also be obtained on a milky white opaque background by selectively applying the thermal energy to the reversible thermosensitive recording layer for use in the present invention. Further, such image formation and erasure can be repeated many times.

When a colored sheet is placed behind the reversible thermosensitive recording layer of the reversible thermosensitive recording material, the colored image can be obtained on the white opaque background or the white opaque image can be obtained on the colored background.

In the case where the reversible thermosensitive recording material of the present invention is projected to OHP (Over Head Projector), a milky white opaque portion in the recording material appears dark and a transparent portion in the recording material, through which the light passes becomes a bright portion on the screen.

To form the reversible thermosensitive recording layer, (1) a solution in which both the matrix resin and the organic low-molecular-weight material are dissolved, or (2) a dispersion prepared by dispersing the finely-divided particles of the organic low-molecular-weight material in a matrix resin solution may be coated on a support such as a plastic film, a glass plate and a metal plate and then dried. In the case where the above-mentioned dispersion (2) is used for the formation of the reversible thermosensitive recording layer, a solvent which does not dissolve at least one organic low-molecular-weight material therein is used for the matrix resin solution.

The solvent used in the coating liquid for the thermosensitive recording layer can be selected depending on the kind of matrix resin and the type of organic low-molecular-weight material to be employed. For example, solvents such as tetrahydrofuran, methyl ethyl ketone, methyl isobutyl ketone, chloroform, carbon tetrachloride, ethanol, toluene and benzene can be employed. Not only when the matrix resin dispersion (2) is used, but also when the matrix resin solution (1) is used, the organic low-molecular-weight material separates out in the form of finely-divided particles and is dispersed in the matrix resin in the reversible thermosensitive recording layer.

A matrix resin for use in the reversible thermosensitive recording layer forms the recording layer in which finely-divided particles of the organic low-molecular-weight material are uniformly dispersed and impart high transparency to the recording layer when the recording layer is in a maximum transparent state. Therefore, it is preferable that the matrix resin have high transparency, mechanical stability and excellent film forming properties.

Examples of such resin include polyvinyl chloride, vinyl chloride copolymers such as vinyl chloride—vinyl acetate copolymer, vinyl chloride—vinyl acetate—vinyl alcohol copolymer, vinyl chloride—vinyl acetate—maleic acid copolymer, and vinyl chloride—vinyl acrylate copolymer; polyvinylidene chloride, vinylidene chloride copolymers such as vinylidene chloride—vinyl chloride copolymer, and vinylidene chloride—acrylonitrile copolymer; polyester; polyamide; polyacrylate, polymethacrylate and acrylate—methacrylate copolymer; and silicone resin. These resins can be used alone or in combination.

The organic low-molecular-weight material for use in the reversible thermosensitive recording layer may appropriately be selected from the materials which are changeable from the polycrystalline sate to the single crystalline state depending on the temperature thereof. It is preferable that the organic low-molecular-weight material for use in the present invention have a melting point ranging from 30° to 200° C., more preferably from about 50° to 150° C.

Examples of the organic low-molecular-weight material for use in the present invention are alkanols; alkane diols; halogenated alkanols or halogenated alkane diols; alkylamines; alkanes; alkenes; alkynes; halogenated alkanes; halogenated alkenes; halogenated alkynes; cycloalkanes; cycloalkenes; cycloalkynes; saturated or unsaturated monocarboxylic acids, or saturated or unsaturated dicarboxylic acids; and esters, amides and ammonium salts thereof; saturated or unsaturated halogenated fatty acids and esters, amides and ammonium salts thereof; allylcarboxylic acids, and esters, amides and ammonium salts thereof; halogenated allylcarboxylic acids, and esters, amides and ammonium salts thereof; thioalcohols; thiocarboxylic acids, and esters, amides and ammonium salts thereof; and carboxylic acid esters of thioalcohol. These materials can be used alone or in combination.

It is preferable that the number of carbon atoms of the above-mentioned organic low-molecular-weight material be in the range of 10 to 60, more preferably in the range of 10 to 38, further preferably in the range of 10 to 30. Part of the alcohol groups in the esters may be saturated or unsaturated, and further may be substituted by a halogen. In any case, it is preferable that the organic low-molecular-weight material have at least one atom selected from the group consisting of oxygen, nitrogen, sulfur and a halogen in its molecule. More specifically, it is preferable the organic low-molecular-weight materials comprise, for instance, —OH, —COOH, —CONH, —COOR, —NH—, —NH$_2$, —S—, —S—S—, —O— or a halogen atom.

Specific examples of the above-mentioned organic low-molecular-weight materials include higher fatty acids such as lauric acid, dodecanoic acid, myristic acid, pentadecanoic acid, palmitic acid, stearic acid, behenic acid, nonadecanoic acid, arachic acid, and oleic acid; esters of higher fatty acids such as methyl stearate, tetradecycl stearate, octadecyl stearate, octadecyl laurate, tetradecyl palmitate and dodecyl behenate; and the following ethers or thioethers:

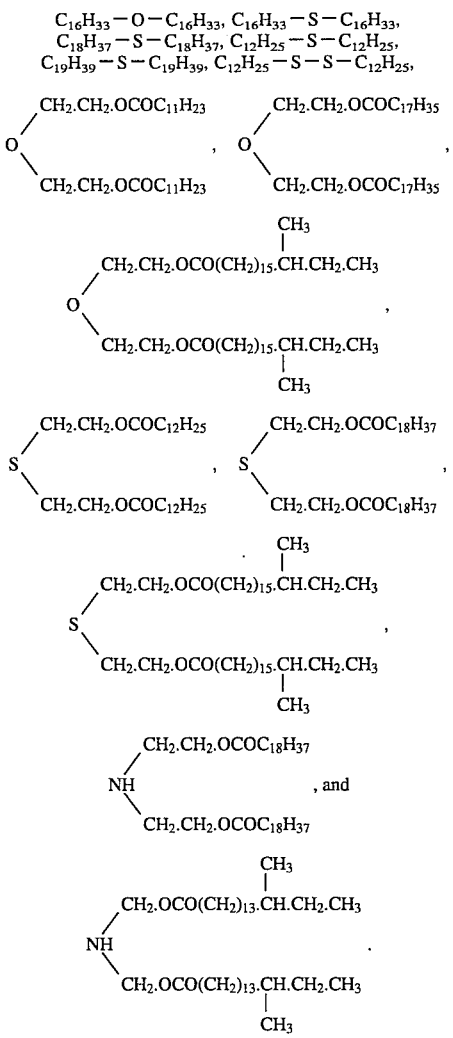

Of these, higher fatty acids having 16 or more carbon atoms, more preferably having 16 to 24 carbon atoms, such as palmitic acid, stearic acid, behenic acid and lignoceric acid are preferred in the present invention.

To extend the temperature range where the reversible thermosensitive recording layer maintains the transparent state, the above-mentioned organic low-molecular-weight materials may appropriately be used in combination. Alternatively, the above-mentioned organic low-molecular-weight material may be used in combination with the other materials having a different melting point, as disclosed in Japanese Laid-Open Patent Applications 63-39378 and 63-130380, and Japanese Patent Applications 63-14754 and 1-140109.

It is preferable that the ratio by weight of the organic low-molecular-weight material to the matrix resin be in the range of about (2:1) to (1:16), more preferably in the range of (1:1) to (1:3). When the ratio of the organic low-molecular-weight material to the matrix resin is within the above range, the matrix resin can form a film in which the organic low-molecular-weight material is uniformly dispersed in the form of finely-divided particles, and the obtained recording layer can readily reach the maximum white opaque state.

In the reversible thermosensitive recording layer for use in the present invention, additives such as a surface-active agent and a high-boiling point solvent can be employed to facilitate the formation of a transparent image.

Specific examples of the high-boiling point solvent are tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol, di-2-ethyl butyrate, methyl acetylricinoleate, butyl acetylricinoleate, butylphthalyl butyl glycolate and tributyl acetylcitrate.

Specific examples of the surface-active agent and other additives are polyhydric alcohol higher fatty acid esters; polyhydric alcohol higher alkyl ethers; higher alcohol; higher alkylphenol; higher alkylamine of higher fatty acid; amides of higher fatty acid; lower olefin oxide adducts of fat and oil and polypropylene glycol; acetylene glycol; sodium calcium, barium and magnesium salts of higher alkyl benzensulfonic acid; calcium, barium and magnesium salts of higher fatty acid, aromatic carboxylic acid, higher aliphatic sulfonic acid, aromatic sulfonic acid, sulfuric monoester, phosphoric monoester and phosphoric diester; lower sulfated oil; long-chain polyalkyl acrylate; acrylic oligomer; long-chain polyalkyl methacrylate; copolymer of long-chain alkyl methacrylate and amine-containing monomer; styrene—maleic anhydride copolymer; and olefin—maleic anhydride copolymer.

In the present invention, when the image formed on the reversible thermosensitive recording material is observed as a reflection type image, a light reflection layer may be formed behind the recording layer to improve the contrast of the image even if the thickness of the recording layer is made thin. Specifically, the light reflection layer can be prepared by deposition of aluminum, nickel and tin on the support as disclosed in Japanese Laid-Open Patent Application 64-14079.

In the present invention, a protective layer may be formed on the reversible thermosensitive recording layer to protect the thermosensitive recording layer. It is preferable that the protective layer have a thickness in the range of 0.1 to 5 μm. As the material for the protective layer, silicone rubber, silicone resin (described in Japanese Laid-Open Patent application 63-221087), polysiloxane graft polymer (described in Japanese Patent Application 62-152550), ultraviolet-curing resin or electron-radiation-curing resin (described in Japanese Patent Application 63-310600) can be employed. In any case, the above-mentioned material for the protective layer is dissolved in a solvent to prepare a coating liquid, and the thus prepared coating liquid is coated on the thermosensitive recording layer. It is desirable that the matrix resin and the organic low-molecular-weight material for use in the thermosensitive recording layer be not easily dissolved in such a solvent for use in the protective layer.

Preferable examples of the above-mentioned solvent for use in a coating liquid for the protective layer include n-hexane, methyl alcohol, ethyl alcohol and isopropyl alcohol. In particular, alcohol-based solvents are preferred from the viewpoint of cost.

Further, an intermediate layer may be interposed between the protective layer and the thermosensitive recording layer to protect the thermosensitive recording layer from the solvent or a monomer component for use in the coating liquid for the protect layer, as disclosed in Japanese Laid-Open Patent Application 1-133781.

Examples of the material for use in the coating liquid for the intermediate layer include the same resins as used for the matrix resin in the thermosensitive recording layer, and thermosetting resins and thermoplastic resins such as polyethylene, polypropylene, polystyrene, polyvinyl alcohol, polyvinyl butyral, polyurethane, saturated polyester, unsaturated polyester, epoxy resin, phenolic resin, polycarbonate, and polyamide.

It is preferable that the intermediate layer have a thickness of about 0.1 to 2 μm.

Moreover, the reversible thermosensitive recording material can be employed as a card with the provision of a magnetic recording layer therein as described in Japanese Laid-Open Utility Model Application No. 2-3876.

Other features of this invention will become apparent in the course of the following description of exemplary embodiments which are given for illustration of the invention and are not intended to be limiting thereof.

FABRICATION OF REVERSIBLE THERMOSENSITIVE RECORDING MATERIAL NO. 1

Formation of Reversible Thermosensitive Recording Layer

The following components were mixed to prepare a coating liquid for a reversible thermosensitive recording layer:

|  | Parts by Weight |
| --- | --- |
| Behenic acid | 7 |
| Eicosanedioic acid | 3 |
| Diisodecyl phthalate | 2 |
| Vinyl chloride - vinyl acetate copolymer resin (Trademark: "VYHH", made by Union Carbide Japan K.K) | 40 |
| THF | 150 |
| Toluene | 15 |

The thus obtained coating liquid was coated ion a polyester film with a thickness of 100 μm, serving as a support, and dried, whereby a reversible thermosensitive recording layer was provided on the support.

Formation of Protective Layer

The following components were mixed to prepare a coating liquid for a protective layer:

|  | Parts by Weight |
| --- | --- |
| 75% butyl acetate solution of urethaneacrylate-based ultraviolet-curing resin (Trademark: "Unidic C7-157", made by Dainippon ink & Chemicals, Incorporated.) | 10 |
| Toluene | 10 |

The thus obtained coating liquid for a protective layer was coated on the reversible thermosensitive recording layer dried, and irradiated by an ultraviolet lamp, so that a protective layer was formed on the reversible thermosensitive recording layer. Thus, a reversible thermosensitive recording material No. 1 was fabricated.

FABRICATION OF REVERSIBLE THERMOSENSITIVE RECORDING MATERIAL NO. 2

The procedure for fabrication of the reversible thermosensitive recording material No. 1 was repeated except that the polyester film with a thickness of 100 μm serving as a support was replaced by a polyester film with a thickness of 188 μm, whereby a reversible thermosensitive recording material No. 2 was fabricated.

Each of the thus obtained reversible thermosensitive recording Materials Nos. 1 and 2 has such characteristics that the display media assume a milky white opaque state at a second temperature of about 100° C. or more, and assume a transparent state at a first temperature ranging from 70° to 100° C.

Then, the thus fabricated reversible thermosensitive recording material No. 1 was applied to a card-type plate made of polyvinyl chloride with a thickness of 1 mm, whereby a display medium A with the structure as shown in FIG. 2(b) was prepared. Successively, the above-fabricated reversible thermosensitive recording material No. 1 was adhered to a card-type plate made of polyvinyl chloride with a thickness of 1 mm in such a fashion that a silicone rubber in the form of a plate with a hardness of 20° in terms of the spring type hardness $Hs_2$ and with a thickness of 0.4 mm is interposed between the recording material No. 1 and the card-type plate, whereby a display medium B with the structure as shown in FIG. 2(c) was prepared. The hardness $Hs_1$ of the display medium B at a surface thereof measured by use of a spring type hardness tester was about 80°.

Moreover, the reversible thermosensitive recording material No. 2 was cut into a card form, whereby a display medium C was prepared. The display medium C has a thickness of 210 μm and a stiffness of about 150 gf.cm in terms of the testing method for stiffness of paperboard by bending load defined by JIS P-8125.

IMAGE FORMATION AND ERASURE TEST

A test for image formation and erasure was repeated 1000 times on the above prepared display media A, B and C in such a manner as shown in Examples 1 to 5 and Comparative Example 1. After the 1000 times repetition of the test, the display media A, B and C were visually inspected if each of the display media was deformed or not, and if each of the display media can be caused to be transparent completely with the application of heat for 0.5 sec.

EXAMPLE 1

The image formation and erasure test was repeated on the display medium A in which a milky white opaque image was formed on the display medium A by use of a thermal head, and the display medium A was caused to be transparent by use of a hot stamp 11 employed as a heat application member as shown in FIG. 1(a). In reference to FIG. 1(a), reference numeral 2 indicates an infrared lamp, reference numeral 3, a temperature sensor, and reference numeral 4, a highly elastic member, reference numeral 5, a display medium, and reference numeral 61, a supporting base.

A silicone rubber in the form of a plate with a thickness d of 1.0 mm, a spring type hardness $Hs_2$ of 30° and a thermal conductivity κ of 0.2 $W \cdot m^{-1} \cdot K^{-1}$ was employed as the highly elastic member 4 by being used and deposited on the metal surface of the hot stamp 11. The spring type hardness of the hot stamp 11 at the surface thereof $Hs_1$ was about 70°. Deformation of the display medium A was observed after the image formation and erasure test was repeated about 100 times, and warpage and difference in lebel in the form of lines were observed after the test was repeated 1000 times. Even after repeated image formation and erasure for 1000 times, the display medium A was caused to be transparent by the application of heat thereto for 0.5 sec without difficulty.

EXAMPLE 2

The image formation and erasure test was repeated on the display medium A in which a milky white opaque image was formed on the display medium A by use of a thermal head, and the display medium A was caused to be transparent by use of a hot stamp 11 employed as a heat application member as shown in FIG. 1(*c*). In reference to FIG. 1(*c*), as mentioned previously, reference numeral 2 indicates an infrared lamp, reference numeral 3, a temperature sensor, reference numeral 4, highly elastic member, and reference numeral 7, pressure application member. A silicone rubber in the form of a plate with a thickness d of 1.0 mm, the spring type hardness $Hs_2$ of 30°, and a thermal conductivity κ of 0.2 $W \cdot m^{-1} \cdot K^{-1}$ was employed as the highly elastic member 4 by being fused and deposited on the metal surface of the hot stamp 11. The spring type hardness of the hot stamp 11 at surface thereof $Hs_1$ was about 70°. Difference in lebel in the form of lines was observed on the display medium A after the image formation and erasure test was repeated 100 times. In addition, warpage of the display medium A was not observed after the test was repeated 1000 times, and only difference in lebel in the form lines was observed. Even after repetition of image formation and erasure for 1000 times, the display medium A was caused to be transparent by the application of heat thereto for 0.5 sec without difficulty.

EXAMPLE 3

The image formation and erasure test was repeated on the display medium A in which a milky white opaque image was formed on the display medium A by use of a thermal head, and the display medium A was caused to be transparent by use of a hot stamp 11 employed as a heat application member as shown in FIG. 1(*d*). In reference to FIG. 1(*d*), as mentioned previously, reference numeral 2 indicates an infrared lamp, reference numeral 3, a temperature sensor, reference numeral 4, a highly elastic member, and reference numeral 7, a pressure application member. A silicone rubber in the form of a plate with a thickness d of 1.0 mm, a spring type hardness $Hs_2$ of 30°, and a thermal conductivity κ of 0.2 $W \cdot m^{-1} \cdot K^{-1}$ was employed as the highly elastic member 4 by being fused and deposited on the metal surface of the hot stamp 11. The spring type hardness of the hot stamp 11 at surface thereof $Hs_1$ was abut 70°. The hot stamp 11 in FIG. 1(*d*) has round corners 8 with a curvature radius of about 2 mm at the surface thereof which is to be contact with the display medium A.

Deformation of the display medium A was not observed after the image formation and erasure test was repeated 100 times. In addition, warpage of the display medium A was not observed after the test was repeated 1000 times, and only difference in lebel in the form lines was slightly observed. Even after repetition of image formation and erasure for 1000 times, the display medium A was caused to be transparent by the application of heat thereto for 0.5 sec without difficulty.

EXAMPLE 4

The image formation and erasure test was repeated on the display medium B in which a milky white opaque image was formed on the display medium B by use of a thermal head, and the display medium B was caused to be transparent by use of a hot stamp 11 employed as a heat application member as shown in FIG. 1(*b*). In reference to FIG. 1(*b*), reference numeral 2 indicates an infrared lamp, reference numeral 3, a temperature sensor, reference numeral 5, the display medium B, and reference numeral 61, a supporting base. The hot stamp 11 shown in FIG. 1(*b*) has round corners 8 with a curvature radius of about 2 mm at the surface thereof which is to be contact with the display medium B.

Deformation of the display medium B was observed after the image formation and erasure test was repeated about 100 times, and warpage thereof was observed after the 1000 times repetition of the test. The display medium B was caused to be transparent by the application of heat thereto for 0.5 sec without difficulty even after the image formation and erasure test was repeated 1000 times.

EXAMPLE 5

The image formation and erasure test was repeated on the display medium C in which a milky white opaque image was formed on the display medium C by use of a thermal head, and the display medium C was caused to be transparent by use of a hot stamp 11 employed as a heat application member as shown in FIG. 1(*f*). In reference to FIG. 1(*f*), reference numeral 2 indicates an infrared lamp, reference numeral 3, a temperature sensor, reference numeral 5, the display medium C, and reference numeral 61, a supporting base.

A silicone rubber in the form of a plate, serving as a highly elastic member with a thickness d of 10.0 mm, a spring type hardness $Hs_2$ of 40° and a thermal conductivity κ of 0.2 $W \cdot m^{-1} \cdot K^{-1}$ was fused and deposited on the surface of the supporting base 61, which is to be contact with the display medium C. The spring type hardness of the display medium C provided on the supporting base 61 $Hs_1$ was about 80°.

Deformation of the display medium C was observed after the image formation and erasure test was repeated about 100 times.

Although warpage of the display medium C was observed, the display medium C was caused to be transparent by the application of heat thereto for 0.5 sec without difficulty after the image formation and erasure test was repeated 1000 times.

COMPARATIVE EXAMPLE 1

The image formation and erasure test was repeated on a display medium A in which a milky white opaque image was formed on the display medium A by use of a thermal head and the display medium A was caused to be transparent by use of a heat application member 11 as shown in FIG. 1(*g*).

In reference to FIG. 1(*g*), as mentioned previously, reference numeral 2 indicates an infrared lamp, reference numeral 3, a temperature sensor, reference numeral 5, a display medium A, and reference numeral 61, a supporting base.

Deformation of the display medium A in the form of lines was observed after the image formation and erasure test was carried out once, and both deformation of the display medium A in the form of lines and warpage thereof were observed after the test was repeated about 100 times, so that the image erasure was performed only in spots by the application of heat thereto for 0.5 sec.

As is obvious from the above, by the image recording method according to the present invention, the deformation of the display medium can be prevented, and image can be formed on a display medium with certainty even though the display medium is deformed.

What is claimed is:

1. An image recording method for recording information in and erasing recorded information from a display medium comprising the steps of:

providing a heat application member at a temperature sufficient to record or erase information from said display medium; and stamping said display medium with said heat application member, wherein said heat application member has round corners at a contacting surface of said heat application member with said display medium, and said display medium comprises a reversible thermosensitive recording medium capable of writing information therein and erasing recorded information therefrom by the application of heat thereto.

2. The image recording method of claim 1, wherein said display medium is provided on a supporting base.

3. The image recording method of claim 1, wherein said round corners have a radius of curvature of 0.5 to 20 mm.

4. The image recording method of claim 1, wherein said round corners have a radius of curvature of 1 to 10 mm.

5. The image recording method of claim 1, wherein said round corners have a radius of curvature of 1.5 to 5 mm.

6. The image recording method of claim 1, wherein said display medium comprises an elastically deformable portion.

* * * * *

UNITED STATES PATENT AND TRADEMARK OFFICE
CERTIFICATE OF CORRECTION

PATENT NO. : 5,583,554
DATED : DECEMBER 10, 1996
INVENTOR(S) : FUMIHITO MASUBUCHI ET AL

It is certified that error appears in the above-identified patent and that said Letters Patent is hereby corrected as shown below:

Column 5, line 59, "pa" should read --a--.

Column 6, line 33, "conduced" should read --conducted--.

Column 8, line 25, "conducts" should read --conduct--.

Column 9, line 28, "heat to the both side" should read --heating both sides--.

Column 10, line 31, "lebel" should read --level--;
    line 34, "have" should read --has--;
    line 38, "be contact" should read --be in contact--
    line 58, "be contact" should read --be in contact--.

Column 11, line 58, "according the" should read --according to the--.

Column 17, line 50, "ion" should read --on--.

Column 19, line 10, "lebel" should read --level--;
    line 38, "lebel" should read --level--;
    line 62, "be contact" should read --be in contact--;
    line 67, "and only" should read --and the only--.

UNITED STATES PATENT AND TRADEMARK OFFICE
CERTIFICATE OF CORRECTION

PATENT NO. : 5,583,554
DATED : DECEMBER 10, 1996
INVENTOR(S) : FUMIHITO MASUBUCHI ET AL

It is certified that error appears in the above-identified patent and that said Letters Patent is hereby corrected as shown below:

Column 20, line 1, "lebel" should read --level--;
                line 20, "be contact" should read --be in contact--;
                line 46, "be contact" should read --be in contact--.

Signed and Sealed this

Twenty-third Day of June, 1998

Attest:

BRUCE LEHMAN

Attesting Officer        Commissioner of Patents and Trademarks